US008573383B2

(12) United States Patent
Koo

(10) Patent No.: US 8,573,383 B2
(45) Date of Patent: Nov. 5, 2013

(54) MEDIUM TRANSFERRING APPARATUS AND FINANCIAL DEVICE

(75) Inventor: Kun Hyung Koo, Gyeonggi-do (KR)

(73) Assignee: LG CNS Co., Ltd., Seoul (KR)

( * ) Notice: Subject to any disclaimer, the term of this patent is extended or adjusted under 35 U.S.C. 154(b) by 82 days.

(21) Appl. No.: 13/282,007

(22) Filed: Oct. 26, 2011

(65) Prior Publication Data

US 2012/0103759 A1 May 3, 2012

(30) Foreign Application Priority Data

Oct. 29, 2010 (KR) ........................ 10-2010-0107101

(51) Int. Cl.
*B65G 47/244* (2006.01)

(52) U.S. Cl.
USPC ....... 198/397.06; 198/411; 198/624; 271/251

(58) Field of Classification Search
USPC ............ 198/397.06, 400, 410, 411, 604, 624; 271/520, 248, 251, 250
See application file for complete search history.

(56) References Cited

U.S. PATENT DOCUMENTS

| | | | | |
|---|---|---|---|---|
| 4,270,879 | A * | 6/1981 | Kacirek | 414/788.9 |
| 4,436,298 | A * | 3/1984 | Donner et al. | 271/10.12 |
| 4,685,664 | A * | 8/1987 | Petersdorf | 271/227 |
| 4,919,318 | A * | 4/1990 | Wong | 226/17 |
| 5,253,862 | A * | 10/1993 | Acquaviva et al. | 271/251 |
| 5,697,609 | A * | 12/1997 | Williams et al. | 271/228 |
| 6,164,643 | A * | 12/2000 | Otsuka | 271/250 |
| 6,634,521 | B1 * | 10/2003 | Hwang | 221/228 |
| 6,811,152 | B2 * | 11/2004 | Delfosse et al. | 271/225 |
| 6,896,256 | B2 * | 5/2005 | Hozumi | 271/228 |
| 7,445,208 | B2 * | 11/2008 | Onodera | 271/239 |
| 8,297,616 | B2 * | 10/2012 | Tharayil | 271/228 |
| 8,308,160 | B2 * | 11/2012 | Miyazawa | 271/251 |
| 8,328,188 | B2 * | 12/2012 | Mandel et al. | 271/228 |
| 2009/0152806 | A1 * | 6/2009 | Buddendeck et al. | 271/228 |

FOREIGN PATENT DOCUMENTS

| | | | |
|---|---|---|---|
| JP | 55140446 | A * | 11/1980 |
| JP | 06-001496 | A | 1/1994 |
| KR | 10-2006-0093333 | A | 8/2006 |
| KR | 10-2007-0122006 | A | 12/2007 |

OTHER PUBLICATIONS

Notice of Allowance dated Mar. 20, 2012 in Korean Application No. 10-2010-0107101, filed Oct. 29, 2010.

* cited by examiner

*Primary Examiner* — Gene Crawford
*Assistant Examiner* — Keith R Campbell
(74) *Attorney, Agent, or Firm* — Saliwanchik, Lloyd & Eisenschenk

(57) ABSTRACT

Provided is a medium transferring apparatus, which comprises a plurality of side guides, one or more transfer rollers, and one or more aligning rollers. The side guides constitute both side surfaces of a medium transferring path. The transfer rollers are rotatable between the side guides, and transfer a medium in a medium transferring direction. The aligning rollers align the medium in a direction inclined from the medium transferring direction.

16 Claims, 6 Drawing Sheets

MEDIUM TRANSFERRING APPARATUS AND FINANCIAL DEVICE

CROSS-REFERENCE TO RELATED APPLICATION

This application claims the benefit under 35 U.S.C. §119 of Korean Patent Application No. 10-2010-0107101, filed Oct. 29, 2010, which is hereby incorporated by reference in its entirety.

BACKGROUND

The present disclosure relates to a medium transferring apparatus and a financial device.

Financial devices process a financial transaction a customer desires. Financial devices may deposit/withdraw a medium or automatically transfer the medium. Such a financial device comprises a medium transferring apparatus for transferring a medium.

A medium guide for guiding the transferring of a medium is disposed in the medium transferring apparatus to form a medium transferring path. The medium guide has a width and a gap to form a medium transferring path corresponding the height or width of a medium. Medium introduced into the medium transferring path one by one are transferred to a desired position by torque of a transferring roller or a transferring belt.

Medium guides may have a medium transferring path having a width and a height sufficiently greater than the width and height of a medium in order to prevent damage such as jamming or folding of transferred medium.

However, in this case, when medium is transferred on the medium transferring path, they may be misaligned with their width direction that perpendicular to a medium transferring direction, and thus, they may be stacked unevenly after the transferring. Accordingly, stacking efficiency of medium May be degraded, and medium May be damaged.

BRIEF SUMMARY

Embodiments provide a medium transferring apparatus and a financial device.

In one embodiment, a medium transferring apparatus comprises: a plurality of side guides constituting both side surfaces of a medium transferring path; one or more transfer rollers rotatable between the side guides, and transferring a medium in a medium transferring direction; and one or more aligning rollers aligning the medium in a direction inclined from the medium transferring direction.

In another embodiment, a financial device comprises a medium transferring apparatus for transferring a medium, wherein the medium transferring apparatus comprises: a plurality of side guides constituting both side surfaces of a medium transferring path; one or more transfer rollers rotatable between the plurality of side guides, and transferring the medium in a medium transferring direction; and one or more aligning rollers rotating in a rotation direction different from that of the one or more transfer rollers, to align the medium on one of the plurality of side guides.

The details of one or more embodiments are set forth in the accompanying drawings and the description below. Other features will be apparent from the description and drawings, and from the claims.

DETAILED DESCRIPTION

Figure 1:
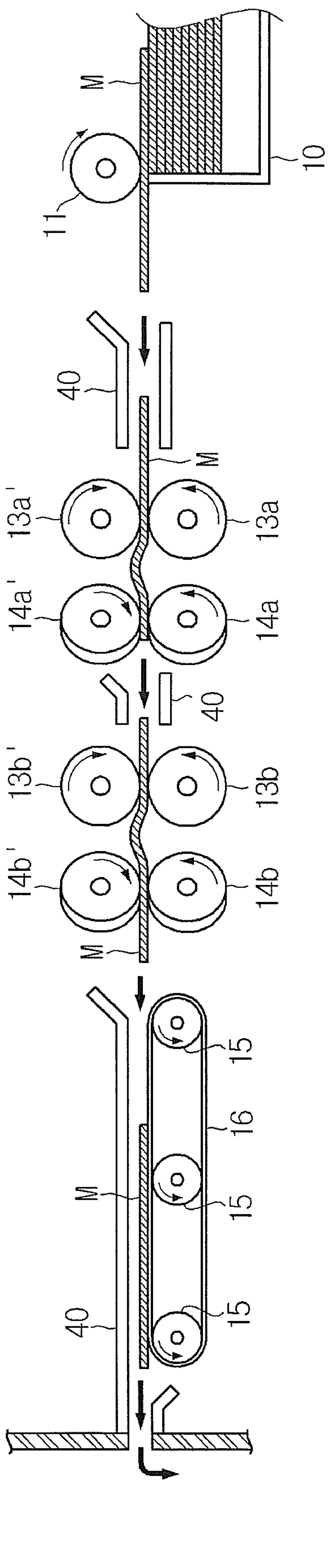
FIG. 1 is a side view illustrating a medium transferring apparatus applied to a financial device according to an embodiment.

Hereinafter, exemplary embodiments of the present disclosure will be described with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

Also, in the description of embodiments, terms such as first, second, A, B, (a), (b) or the like may be used herein when describing components of the present invention. Each of these terminologies is not used to define an essence, order or sequence of a corresponding component but used merely to distinguish the corresponding component from other component(s). It should be noted that if it is described in the specification that one component is "connected," "coupled" or "joined" to another component, the former may be directly "connected," "coupled," and "joined" to the latter or "connected", "coupled", and "joined" to the latter via another component.

A financial device according to embodiments is a device that performs financial businesses, i.e., medium processing comprising processing such as deposit processing, giro receipt, or gift certificate exchange and/or processing such as withdrawal processing, giro dispensing, or gift certificate dispensing by receiving various media such as, e.g., paper moneys, bills, giros, coins, gift certificates, etc. For example, the financial device may comprise an automatic teller machine (ATM) such as a cash dispenser (CD) or a cash recycling device. However, the financial device is not limited to the above-described examples. For example, the financial device may be a device for automatically performing the financial businesses such as a financial information system (FIS).

Hereinafter, assuming that the financial device is the ATM, an embodiment will be described. However, this assumption is merely for convenience of description, and technical idea of the present disclosure is not limited to the ATM.

Figure 2:
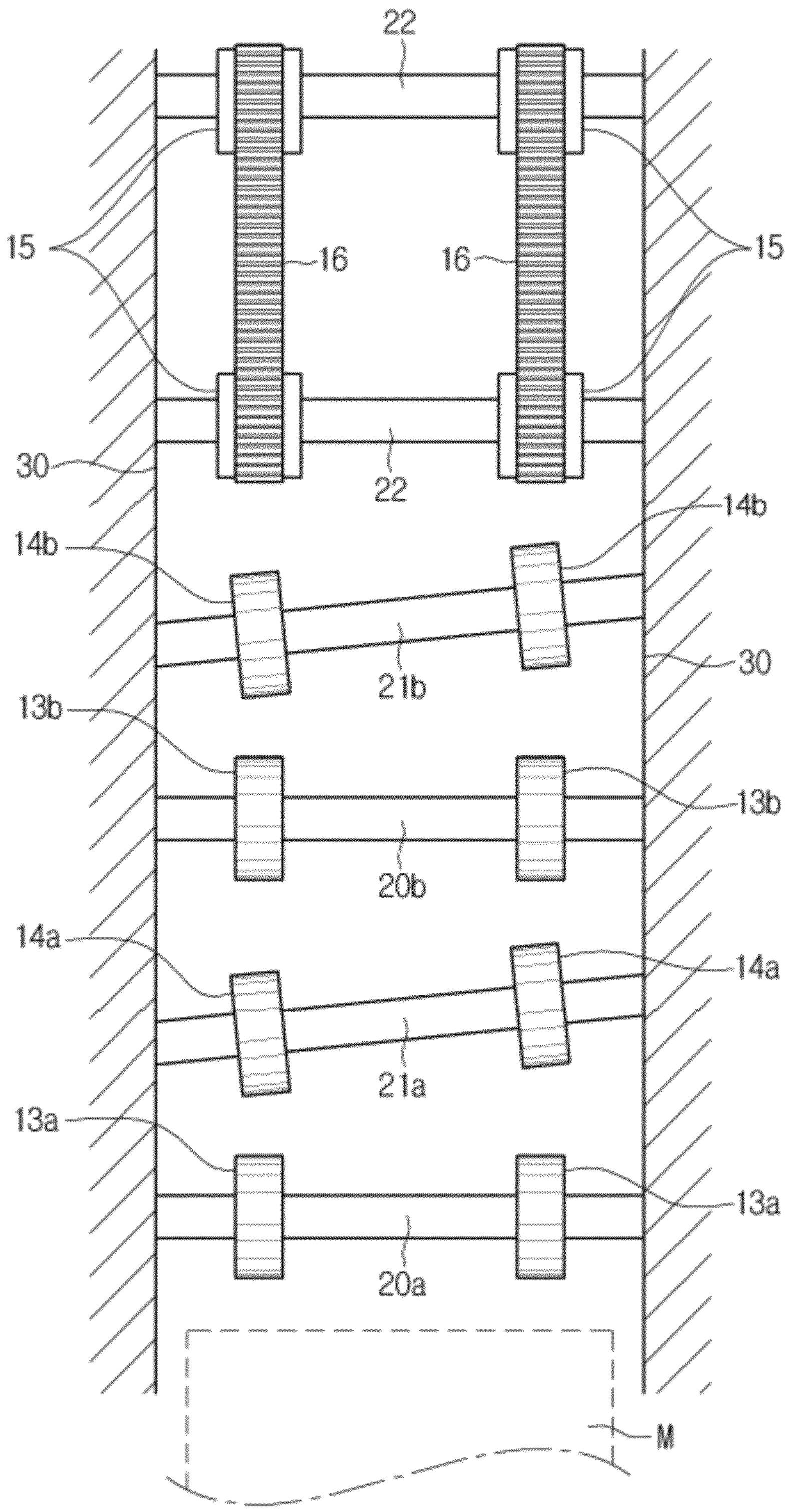
FIG. 2 is a plan view illustrating the medium transferring apparatus of FIG. 1.
Figure 3:
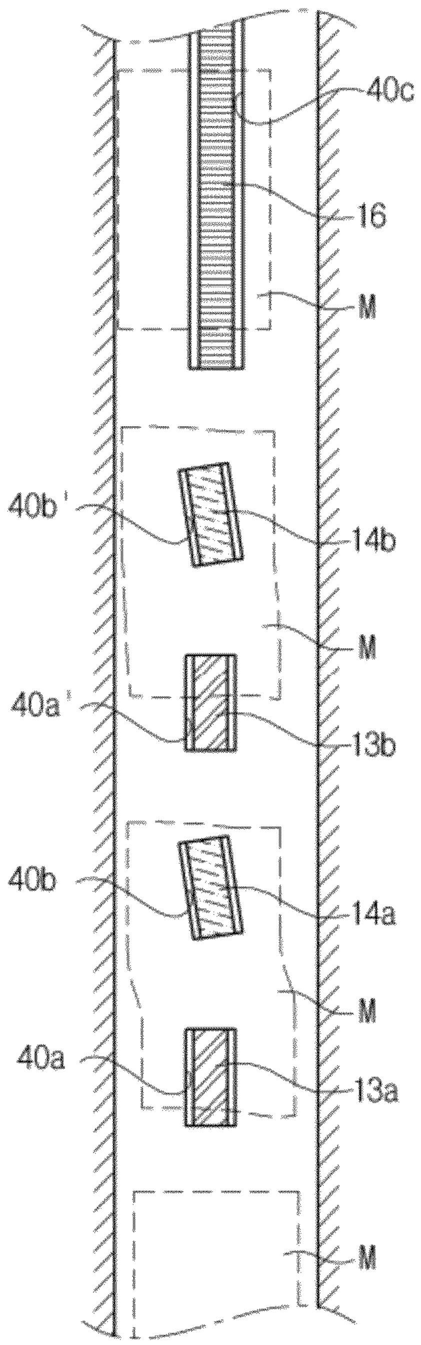
FIG. 3 is a plan view illustrating a medium transferring process of the medium transferring apparatus of FIG. 1.
Figure 4:
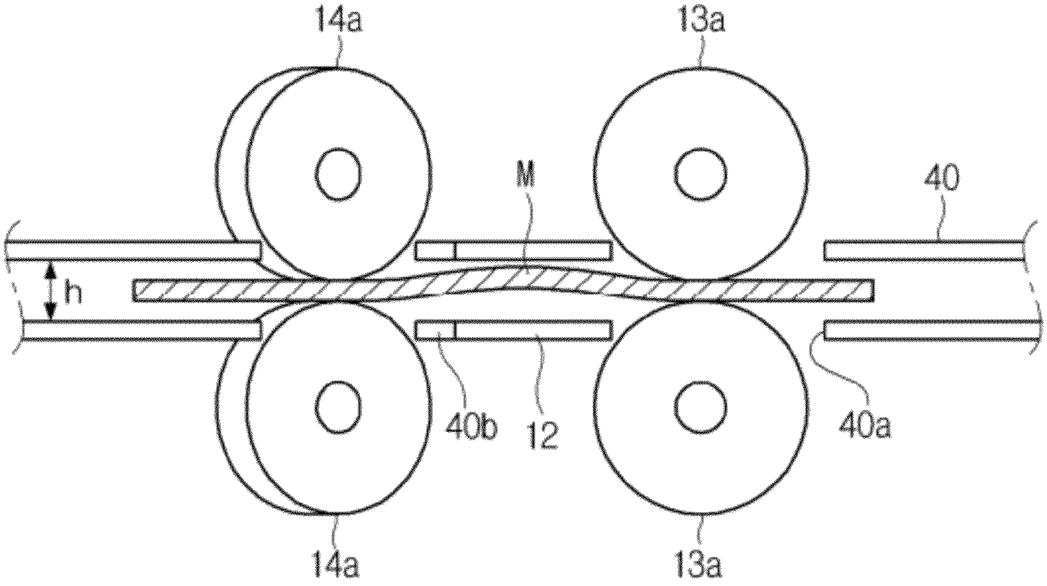
FIG. 4 is a side view illustrating a principal part of the medium transferring apparatus of FIG. 1.

FIG. 1 is a side view illustrating a medium transferring apparatus applied to a financial device according to an embodiment. FIG. 2 is a plan view illustrating the medium transferring apparatus of FIG. 1. FIG. 3 is a plan view illustrating a medium transferring process of the medium transferring apparatus of FIG. 1. FIG. 4 is a side view illustrating a principal part of the medium transferring apparatus of FIG. 1.

Referring to FIGS. 1 to 4, a medium transferring apparatus according to the current embodiment may comprise a cassette 10 in which media M are stacked. The media M are aligned in the cassette 10.

The cassette 10 comprises a pickup roller 11 that may separate and transfer the aligned medium M one by one to a medium transferring path.

One or more transfer rollers 13_a_ and 13_b_ are disposed on the medium transferring path. For example, a plurality of the transfer rollers 13_a_ and a plurality of the transfer rollers 13_b_ may be disposed on the medium transferring path. The transfer rollers 13_a_ and 13_b_ comprise first transfer rollers (also denoted by 13_a_) and second transfer rollers (also denoted by 13_b_) disposed at the downstream side of the first transfer rollers 13_a_ in a medium transferring direction.

The transfer rollers 13_a_ and 13_b_ rotate to transfer the medium M along the medium transferring path. Thus, when contacting the transfer rollers 13_a_ and 13_b_, the medium M receive torque therefrom, and move forward on the medium transferring path. The transfer rollers 13_a_ and 13_b_ may be disposed on at least one of the upper and lower sides of the medium transferring path.

The transfer rollers 13_a_ and 13_b_ are installed on transfer shafts 20_a_ and 20_b_ that rotate in a position perpendicular to side guides 30 to be described later, so as to move the medium M forward along the medium transferring path defined by the side guides 30. One or more of the transfer shafts 20_a_ and 20_b_ may be provided to the medium transferring apparatus. One of the transfer shafts 20_a_ and 20_b_ may be provided with one or more of the transfer rollers 13_a_ or 13_b_.

Idle rollers 13_a_' and 13_b_' are disposed on the opposite side of the medium transferring path to the transfer rollers 13_a_ and 13_b_. Thus, the idle rollers 13_a_' and 13_b_' rotate according to rotations of the transfer rollers 13_a_ and 13_b_, to thereby help the transfer rollers 13_a_ and 13_b_ transfer the medium M.

The medium transferring apparatus comprises one or more aligning rollers 14_a_ and 14_b_ for aligning the medium M while being transferred. For example, a plurality of the aligning rollers 14_a_ and a plurality of the aligning rollers 14_b_ may be provided on the medium transferring apparatus. The aligning rollers 14_a_ and 14_b_ comprise first aligning rollers (also denoted by 14_a_) and second aligning rollers (also denoted by 14_b_) disposed at the downstream side of the first aligning rollers 14_a_ in the medium transferring direction.

The aligning rollers 14_a_ and 14_b_ rotate in a position inclined at a certain angle from the medium transferring direction. That is, a rotation direction of the aligning rollers 14_a_ and 14_b_ is inclined at a certain angle from that of the transfer rollers 13_a_ and 13_b_, to thereby align the medium M on one of the side guides 30.

To this end, the centers of the aligning rollers 14_a_ and 14_b_ are fixed to aligning shafts 21_a_ and 21_b_ that are not perpendicular to the side guides 30 and are inclined at a certain angle therefrom. That is, the aligning shafts 21_a_ and 21_b_ are inclined at a certain angle from the transfer shafts 20_a_ and 20_b_. The aligning shafts 21_a_ and 21_b_ may be provided with one or more of the aligning rollers 14_a_ and 14_b_. When the aligning shafts 21_a_ and 21_b_ are provided with a plurality of the aligning rollers 14_a_ and 14_b_, the aligning rollers 14_a_ and 14_b_ are parallel to one another.

The aligning rollers 14_a_ and 14_b_ receive torque from the aligning shafts 21_a_ and 21_b_ to move the medium M. That is, when the medium M contact the aligning rollers 14_a_ and 14_b_, since the aligning rollers 14_a_ and 14_b_ rotate in a position inclined at a certain angle, the medium M moves over a certain distance in the medium transferring direction, and also moves to one of the side guides 30. In other words, the moving of the medium M by the aligning rollers 14_a_ and 14_b_ has a vector component parallel to the medium transferring direction and a vector component perpendicular thereto. This is because the aligning rollers 14_a_ and 14_b_ are inclined at a certain angle, and are not parallel and perpendicular to the medium transferring direction, that is, the rotation direction of the transfer rollers 13_a_ and 13_b_.

A rotation direction of the aligning rollers 14_a_ and 14_b_ in a region where the aligning rollers 14_a_ and 14_b_ contact the medium M is inclined at an angle less than 90°, to the left or right side (to the left side in FIG. 2) from a rotation direction of the transfer rollers 13_a_ and 13_b_ in a region where the transfer rollers 13_a_ and 13_b_ contact the medium M. Since the angle is less than 90°, the medium M can continually move in the medium transferring direction after passing on the aligning rollers 14_a_ and 14_b_. Accordingly, the rotation direction of the aligning rollers 14_a_ and 14_b_ in the region where the aligning rollers 14_a_ and 14_b_ contact the medium M has a vector component parallel to the medium transferring direction. The rotation direction of the aligning rollers 14_a_ and 14_b_ in the region where the aligning rollers 14_a_ and 14_b_ contact the medium M also has a vector component perpendicular to the medium transferring direction, to move the medium M to one of the side guides 30. Thus, in the region where the aligning rollers 14_a_ and 14_b_ contact the medium M, the aligning rollers 14_a_ and 14_b_ rotate in a direction having both the vector components perpendicular and parallel to the medium transferring direction. Thus, the aligning rollers 14_a_ and 14_b_ rotate in a position inclined to the left or right side at a certain angle between 0° and 90° from the rotation direction of the transfer rollers 13_a_ and 13_b_.

Idle rollers 14_a_' and 14_b_' are disposed on the opposite side of the medium transferring path to the aligning rollers 14_a_ and 14_b_. Thus, the idle rollers 14_a_' and 14_b_' rotate according to rotations of the aligning rollers 14_a_ and 14_b_, to thereby help the aligning rollers 14_a_ and 14_b_ transfer the medium M.

Transfer belts 16 may be disposed on the medium transferring path. The transfer belts 16 rotate in the medium transferring direction to move the medium M transferred through the transfer rollers 13_a_ and 13_b_ and the aligning rollers 14_a_ and 14_b_. Each of the transfer belts 16 is wound around at least two belt rollers 15. The transfer belts 16 extend in the longitudinal direction of the side guides 30. To this end, the belt rollers 15 are fixed to rotation shafts 22 perpendicular to the side guides 30.

The side guides 30 are disposed at the left and right sides of the medium transferring path provided with the transfer rollers 13_a_ and 13_b_ and the aligning rollers 14_a_ and 14_b_, to limit horizontal movements except for the movement in the medium transferring direction, thereby preventing a removal of the medium M from the medium transferring path. The side guides 30 are parallel to each other, and guide the medium M to the medium transferring path. The distance between the side guides 30 is greater by a certain amount than the width of the medium M (the length of the medium M in a direction perpendicular to the medium transferring direction). As shown in FIG. 2, since the distance between the side guides 30 is greater than the width of the medium M, jamming or damage of the medium M guided by the side guides 30 along the medium transferring path can be prevented.

The transfer rollers 13_a_ and 13_b_, the aligning rollers 14_a_ and 14_b_, and the transfer belts 16 are disposed all between the side guides 30 to transfer the medium M in the medium transferring direction within the medium transferring path in which the side guides 30 guide the medium M.

The medium transferring apparatus may comprise upper/lower guides 40 disposed at the upper and lower sides of the medium transferring path. The upper/lower guides 40 limit the vertical movement of the medium M to prevent the removal of the medium M from the medium transferring path.

The upper/lower guides 40 may comprise opposite parts to each other. That is, the upper/lower guides 40 may comprise an upper guide and a lower guide. The distance between the upper guide and the lower guide may depend on the thickness of the medium M. As shown in FIG. 1, the upper/lower guides 40 may have a gap that is sufficiently greater than the thickness of the medium M. Accordingly, damage due to curling of the medium M while being transferred can be prevented.

As shown in FIG. 3, one or more first openings 40*a* and 40*a*' for exposing a portion of the transfer rollers 13*a* and 13*b* to the medium transferring path, and one or more second openings 40*b* and 40*b*' for exposing a portion of the aligning rollers 14*a* and 14*b* to the medium transferring path may pass through the upper/lower guides 40. The first openings 40*a* and 40*a*' may extend in the rotation direction of the transfer rollers 13*a* and 13*b*. The second openings 40*b* and 40*b*' may extend in the rotation direction of the aligning rollers 14*a* and 14*b*. The upper/lower guides 40 may be provided with third openings 40*c* for exposing a surface of the transfer belts 16 rotating in the medium transferring direction.

Thus, the medium M are surrounded and guided by the side guides 30 and the upper/lower guides 40, and are transferred in the medium transferring direction by the transfer rollers 13*a* and 13*b*, the aligning rollers 14*a* and 14*b*, and the transfer belts 16 through the first openings 40*a* and 40*a*', the second openings 40*b* and 40*b*', and the third openings 40*c*. Since the aligning rollers 14*a* and 14*b* move the medium M to one of the side guides 30 as described above, the medium M are aligned all on one of the left and right sides (on the left side in FIG. 2), to thereby prevent the medium M from being stacked unevenly to the left and right sides.

That is, the aligning rollers 14*a* and 14*b* align the medium M such that a surface of the medium M contacts one of the side guides 30, and thus, the transferred medium M are stacked evenly in their width direction. When each of the aligning rollers 14*a* and 14*b* is provided in plurality, the aligning rollers 14*a* or 14*b* are inclined in the same direction.

The process that the medium transferring apparatus transfers the medium M will now be described in more detail with reference to FIGS. 3 and 4.

When the medium M enter the medium transferring path, the medium M may lean left or right between the side guides 30 having the distance greater than the width of the medium M, or be disposed in the middle therebetween as shown in FIG. 3. That is, when entering the medium transferring path, the medium M may be placed unevenly in their width direction.

When the medium M enters the medium transferring path, and the front end of the medium M passes on the transfer roller 13*a*, the medium M is transferred by the rotation of the transfer roller 13*a*, in the medium transferring direction, that is, in the direction parallel to the side guides 30. Then, the front end of the medium M enters the aligning roller 14*a*. The aligning roller 14*a* moves the front end of the medium M to the left side of FIG. 3. At this point, the rear end of the medium M passes on the transfer roller 13*a*, and thus, the medium M is curled in its width direction as shown in FIG. 3.

When the aligning roller 14*a* and the transfer roller 13*a* have the same rotation speed, since the aligning roller 14*a* is inclined from the transfer roller 13*a*, a transferring speed of the aligning roller 14*a* in the medium transferring direction is slower than that of the transfer roller 13*a*. Thus, when the front end of the medium M is on the aligning roller 14*a*, and the rear end of the medium M is on the transfer roller 13*a*, the medium M may also be curled in its longitudinal direction (in the medium transferring direction).

As such, since the medium M may be curled, a distance h between the upper/lower guides 40 may be determined based on a curl height between the aligning roller 14*a* or 14*b* and the transfer roller 13*a* or 13*b*.

The distance between the aligning roller 14*a* or 14*b* and the transfer roller 13*a* or 13*b* can be adjusted to decrease a curl height of the medium M, thereby protecting the medium M. That is, when the distance between the aligning roller 14*a* or 14*b* and the transfer roller 13*a* or 13*b* is increased, the curl height of the medium M can be decreased. The curl height of the medium M can be less than the distance h between the upper/lower guides 40 by adjusting the distance h between the upper/lower guides 40 and the distance between the aligning roller 14*a* or 14*b* and the transfer roller 13*a* or 13*b*.

After the medium M is transferred by the transfer rollers 13*a* and 13*b*, a side surface of the medium M is brought into contact with one of the side guides 30 by the aligning rollers 14*a* and 14*b*. Then, the medium M is transferred to the transfer belts 16. Since force from the transfer belts 16 to the medium M is smaller than that of the transfer rollers 13*a* and 13*b* or the aligning rollers 14*a* and 14*b*, a curl formed at the transfer rollers 13*a* and 13*b* or the aligning rollers 14*a* and 14*b* is removed at the transfer belts 16. In this state, the medium M are aligned all on one of the side guides 30.

Accordingly, since the medium M are aligned in their width direction before being stacked, a staked state of the medium M can be improved.

When the transfer rollers 13*a* and 13*b* and the aligning rollers 14*a* and 14*b* have the same rotation speed and the same roller size, the aligning rollers 14*a* and 14*b* may be disposed at the upstream side of the transfer rollers 13*a* and 13*b* in the medium transferring direction, that is, the medium M may contact the aligning rollers 14*a* and 14*b* earlier. In this case, when the rear end of the medium M is caught on the aligning roller 14*a* or 14*b*, and the front end of the medium M enters the transfer roller 13*a* or 13*b*, the transferring speed of the transfer rollers 13*a* and 13*b* in the medium transferring direction is faster than that of the aligning rollers 14*a* and 14*b*, the medium M may be torn by a difference between the transferring speeds.

Thus, when the transfer rollers 13*a* and 13*b* change their positions with the aligning rollers 14*a* and 14*b*, the rotation speed of the transfer rollers 13*a* and 13*b* may be adjusted to be slower than that of the aligning rollers 14*a* and 14*b*, thereby preventing damage to the medium M.

When the transfer rollers 13*a* and 13*b* and the aligning rollers 14*a* and 14*b* are provided, the distance between the aligning roller 14*a* and the transfer roller 13*b* disposed at the downstream side of the aligning roller 14*a* may be increased to prevent the medium M from being simultaneously caught on both the aligning roller 14*a* and the transfer roller 13*b*. Particularly, when the aligning roller 14*a* is disposed between the first and second transfer rollers 13*a* and 13*b*, the distance between the aligning roller 14*a* and the second transfer roller 13*b* may be equal to or greater than the length of the medium M in the medium transferring direction.

Hereinafter, a medium transferring apparatus according to another embodiment will now be described with reference to the accompanying drawings.

Figure 5:
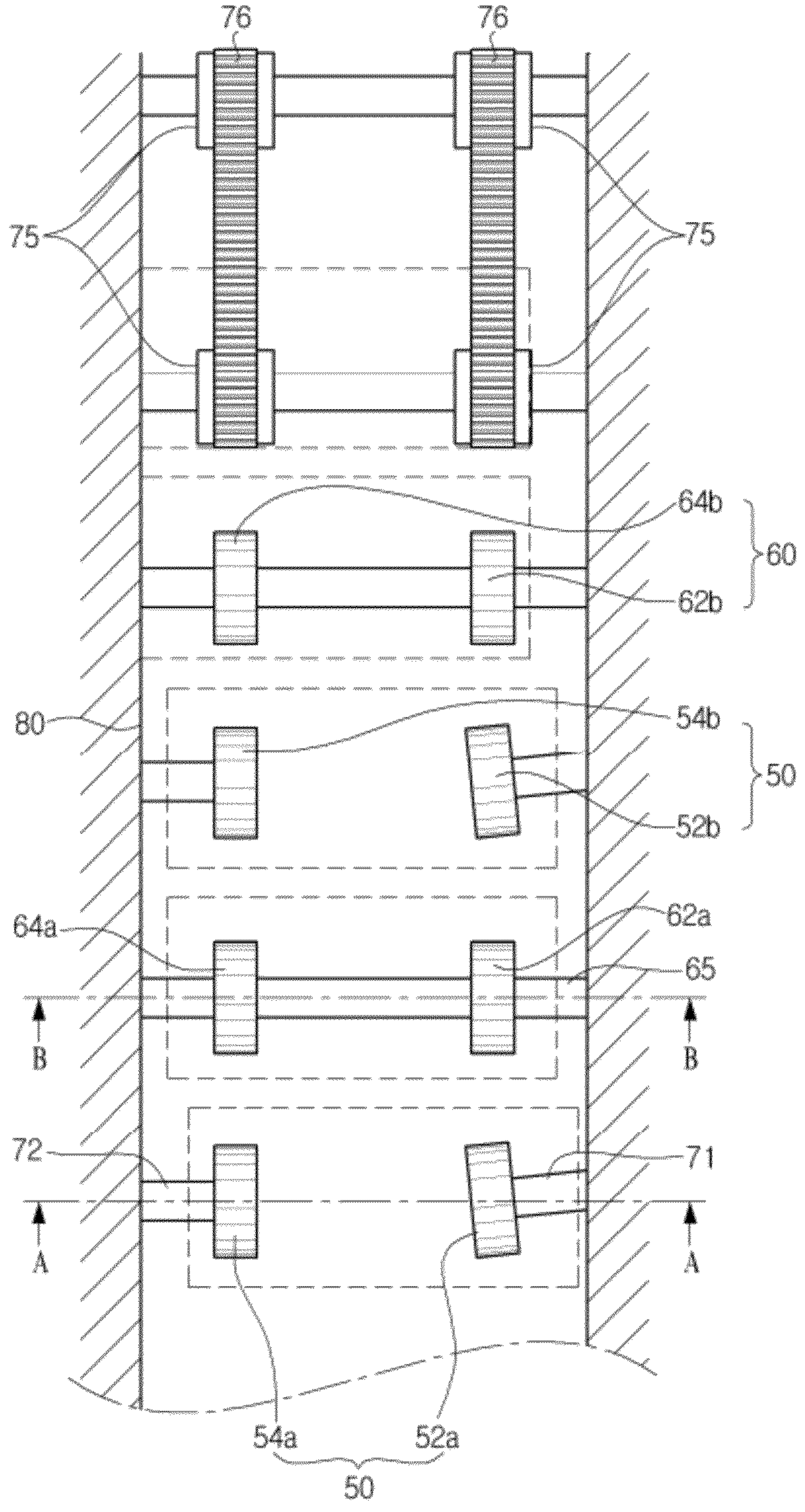
FIG. 5 is a plan view illustrating a medium transferring apparatus according to an embodiment.
Figure 6:
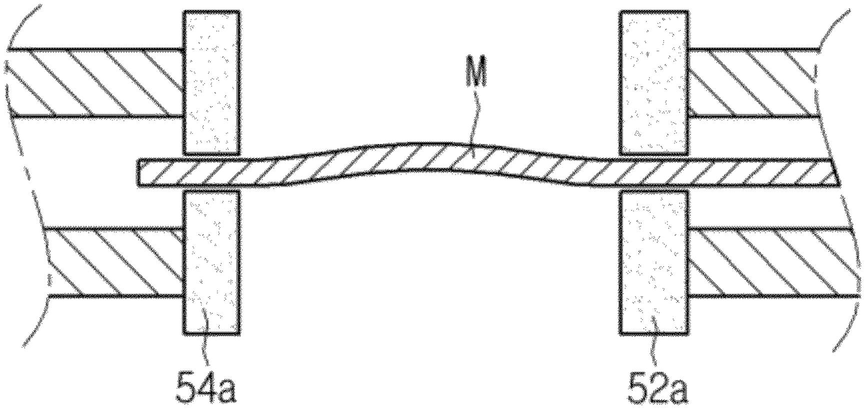
FIG. 6 is a cross-sectional view taken along line A-A of FIG. 5.
Figure 7:
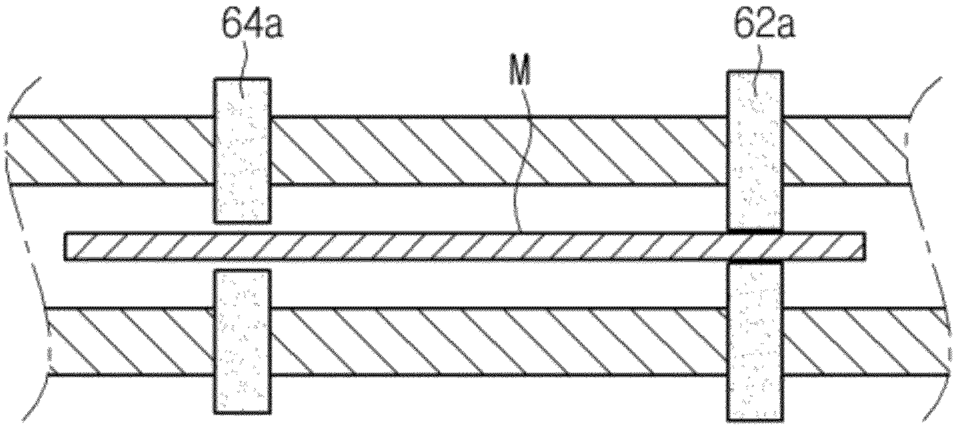
FIG. 7 is a cross-sectional view taken along line B-B of FIG. 5.

FIG. 5 is a plan view illustrating a medium transferring apparatus according to an embodiment. FIG. 6 is a cross-sectional view taken along line A-A of FIG. 5. FIG. 7 is a cross-sectional view taken along line B-B of FIG. 5.

Referring to FIG. 5, one or more aligning rollers 50 and one or more transfer rollers 60 may be disposed on a medium transferring path. The aligning roller 50 comprises first aligning rollers 52*a* and 52*b* rotating in a position inclined at a certain angle from a medium transferring direction, and second aligning rollers Ma and 54*b* rotating in a position parallel to the medium transferring direction. The first aligning rollers 52*a* and 52*b* are spaced apart from the second aligning rollers Ma and 54*b* in a perpendicular direction to the medium transferring direction.

A rotation direction of the first aligning rollers 52*a* and 52*b* is inclined at a certain angle from that of the second aligning rollers Ma and 54*b*, to thereby align medium M on one of two side guides 80. That is, the first aligning rollers 52*a* and 52*b* are inclined at a certain angle to the second aligning rollers Ma and 54*b* with respect to the medium transferring direction. First aligning shafts 71 coupled to the first aligning rollers 52*a* and 52*b* are separated from second aligning shafts 72 coupled to the second aligning rollers Ma and Mb. The second aligning shafts 72 are parallel to transfer shafts 65 of the transfer roller 60. The first aligning shafts 71 are inclined at a certain angle from the second aligning shafts 72 and the transfer shafts 65.

An interaction between the medium M and the aligning roller 50 when the medium M passes on the aligning roller 50 will now be described. Referring to FIG. 6, when the medium M passes on the aligning roller 50, a side of the medium M passing on the first aligning roller 52*a* is guided to the second aligning roller 52*a* according to the rotation direction of the first aligning roller 52*a*. Accordingly, the medium M is curled. That is, when an end of the medium M passes on the first aligning rollers 52*a* and 52*b*, and the other end thereof passes on the second aligning rollers 54*a* and 54*b*, since the first aligning rollers 52*a* and 52*b* are inclined at a certain angle toward the second aligning rollers 54*a* and 54*b*, an end of the medium M on the first aligning rollers 52*a* and 52*b* is pushed to the second aligning rollers 54*a* and 54*b*, thereby curling the middle of the medium M.

The transfer roller 60 as well as the aligning roller 50 is disposed on the medium transferring path, and is disposed at the downstream side of the aligning roller 50 in the medium transferring direction. The transfer roller 60 comprises one or more rollers that are arrayed in a straight line in the direction perpendicular to the medium transferring direction. Although two rollers 62*a* and 64*a* constitute one of the transfer rollers 60 as shown in FIG. 7, the number of rollers constituting the transfer roller 60 may vary with the size or width of the medium M.

The transfer roller 60 rotates in the medium transferring direction, to thereby move the medium M. At this point, the transfer roller 60 receives the medium M curled while passing on the aligning roller 50. To uncurl the medium M toward a medium aligning side, frictional force and pressure applied to the medium M by the roller 64*a* disposed at the medium aligning side may be less than those applied by the roller 62*a* as illustrated in FIG. 7.

That is, the medium transferring direction is from the lower side of FIG. 5 to the upper side thereof, and a medium aligning direction is from the right side of FIG. 5 to the left side thereof. Thus, frictional force and pressure applied to the medium M by the roller 64*a* (a second roller) of the transfer roller 60 at the left side are adjusted to be less than those applied by the roller 62*a* (a second roller) of the transfer roller 60 at the right side, so that the medium M curled while passing on the aligning roller 50 can be uncurled toward the left side, and be aligned on the side guide 80 disposed at the left side. For example, the distance between the roller 64*a* disposed at the left side, and an idle roller corresponding to the roller 64*a* may be greater than the distance between the roller 62*a* disposed at the right side, and an idle roller corresponding to the roller 62*a*.

Since the medium M is uncurled in the medium aligning direction, even though the medium M contacts the side guide 80, folding of the medium M can be prevented.

The medium transferring apparatus may comprise a plurality of transfer belts 76 and a plurality of belt rollers 75 rotating the transfer belts 76 in the medium transferring direction.

Even though all the elements of the embodiments are coupled into one or operated in the combined state, the present disclosure is not limited to such an embodiment. That is, all the elements may be selectively combined with each other without departing the scope of the invention. Furthermore, when it is described that one comprises (or comprises or has) some elements, it should be understood that it may comprise (or comprise or has) only those elements, or it may comprise (or comprise or have) other elements as well as those elements if there is no specific limitation. Unless otherwise specifically defined herein, all terms comprising technical or scientific terms are to be given meanings understood by those skilled in the art. Like terms defined in dictionaries, generally used terms needs to be construed as meaning used in technical contexts and are not construed as ideal or excessively formal meanings unless otherwise clearly defined herein.

Although embodiments have been described with reference to a number of illustrative embodiments thereof, it will be understood by those skilled in the art that various changes in form and details may be made therein without departing from the spirit and scope of the invention as defined by the appended claims. Therefore, the preferred embodiments should be considered in descriptive sense only and not for purposes of limitation, and also the technical scope of the invention is not limited to the embodiments. Furthermore, is defined not by the detailed description of the invention but by the appended claims, and all differences within the scope will be construed as being comprised in the present disclosure.

What is claimed is:

1. A medium transferring apparatus comprising:

a plurality of side guides constituting both side surfaces of a medium transferring path;

one or more transfer rollers rotatable between the side guides, and transferring a medium in a medium transferring direction; and one or more aligning rollers aligning the medium in a direction inclined from the medium transferring direction;

wherein the one or more transfer rollers rotate in the medium transferring direction in a region contacting the medium;

wherein the one or more aligning rollers rotate in a direction inclined at a certain angle from the medium transferring direction in a region contacting the medium; and wherein the one or more aligning rollers are disposed at an upstream of the one or more transfer rollers in the medium transferring direction, and a rotation speed of the one or more aligning rollers is faster than that of the one or more transfer rollers.

2. The medium transferring apparatus of claim 1, wherein the one or more transfer rollers comprise a first transfer roller and a second transfer roller disposed at a downstream of the first transfer roller in the medium transferring direction, and the one or more aligning rollers are disposed between the first transfer roller and the second transfer roller.

3. The medium transferring apparatus of claim 2, wherein a distance between the second transfer roller and the aligning roller is equal to or greater than a length of the medium in the medium transferring direction.

4. The medium transferring apparatus of claim 1, further comprising:

a transfer shaft on which the one or more transfer rollers are installed; and an aligning shaft on which the one or more aligning rollers are installed, the aligning shaft being inclined at a certain angle from the transfer shaft.

5. The medium transferring apparatus of claim 1, wherein the one or more aligning rollers comprise:

a first aligning roller rotating in a position inclined at a certain angle from the medium transferring direction, in a region contacting the medium; and a second aligning roller rotating in the medium transferring direction, in a region contacting the medium.

6. The medium transferring apparatus of claim 5, wherein the first aligning roller is spaced apart from the second aligning roller in a direction perpendicular to the medium transferring direction.

7. The medium transferring apparatus of claim 5, further comprising:

a first aligning shaft on which the first aligning roller is installed; and a second aligning shaft on which the second aligning roller is installed, wherein the second aligning shaft is parallel to a transfer shaft of the one or more transfer rollers, and the first aligning shaft is inclined at a certain angle from the second aligning shaft and the transfer shaft.

8. The medium transferring apparatus of claim 7, wherein the one or more transfer rollers comprise a first roller and a second roller, which are arrayed in a direction perpendicular to the medium transferring direction, and which rotate in the medium transferring direction in a region contacting the medium, and pressure applied on the medium by the second roller disposed in a position corresponding to the second aligning roller is smaller than that applied by the first roller.

9. The medium transferring apparatus of claim 8, wherein idle rollers are disposed in positions corresponding to the first roller and the second roller, respectively, and a distance between the second roller and an idle roller disposed in position corresponding to the second roller is greater than a distance between the first roller and an idle roller disposed in position corresponding to the first roller.

10. The medium transferring apparatus of claim 1, further comprising a transfer belt that is rotatable at a downstream of the one or more aligning rollers in the medium transferring direction, and is wound around two or more rollers.

11. The medium transferring apparatus of claim 1, further comprising upper/lower guides that are parallel to the medium transferring direction, and constitute top and bottom surfaces of the medium transferring path.

12. The medium transferring apparatus of claim 11, wherein a distance between the one or more transfer rollers and the one or more aligning rollers is determined such that a height of a curl formed on the medium is less than a distance between the upper/lower guides when the one or more transfer rollers and the one or more aligning rollers simultaneously transfer the medium.

13. The medium transferring apparatus of claim 11, wherein a distance between the upper/lower guides is determined to be greater than a height of a curl formed on the medium when the one or more transfer rollers and the one or more aligning rollers simultaneously transfer the medium.

14. A financial device comprising a medium transferring apparatus for transferring a medium, wherein the medium transferring apparatus comprises:

a plurality of side guides constituting both side surfaces of a medium transferring path;

one or more transfer rollers rotatable between the plurality of side guides, and transferring the medium in a medium transferring direction; and one or more aligning rollers rotating in a rotation direction different from that of the one or more transfer rollers, to align the medium on one of the plurality of side guides, wherein the one or more aligning rollers comprise:

a first aligning roller rotating in a position inclined at a certain angle from the medium transferring direction, in a region contacting the medium;

a second aligning roller rotating in the medium transferring direction, in a region contacting the medium;

a first aligning shaft on which the first aligning roller is installed; and a second aligning shaft on which the second aligning roller is installed;

wherein the second aligning shaft is parallel to a transfer shaft of the one or more transfer rollers, and the first aligning shaft is inclined at a certain angle from the second aligning shaft and the transfer shaft.

15. The financial device of claim 14, wherein the medium transferring apparatus further comprises a transfer belt that is disposed at a downstream of the one or more aligning rollers in the medium transferring direction, and removes a curl formed on the medium while being aligned.

16. The financial device of claim 14, wherein the medium transferring apparatus further comprises an upper guide and a lower guide, which extend in the medium transferring direction, and constitute top and bottom surfaces of the medium transferring path, and a distance between the upper guide and the lower guide is determined to be greater than a height of a curl formed on the medium when the one or more transfer rollers and the one or more aligning rollers simultaneously transfer the medium.

* * * * *